UNITED STATES PATENT OFFICE.

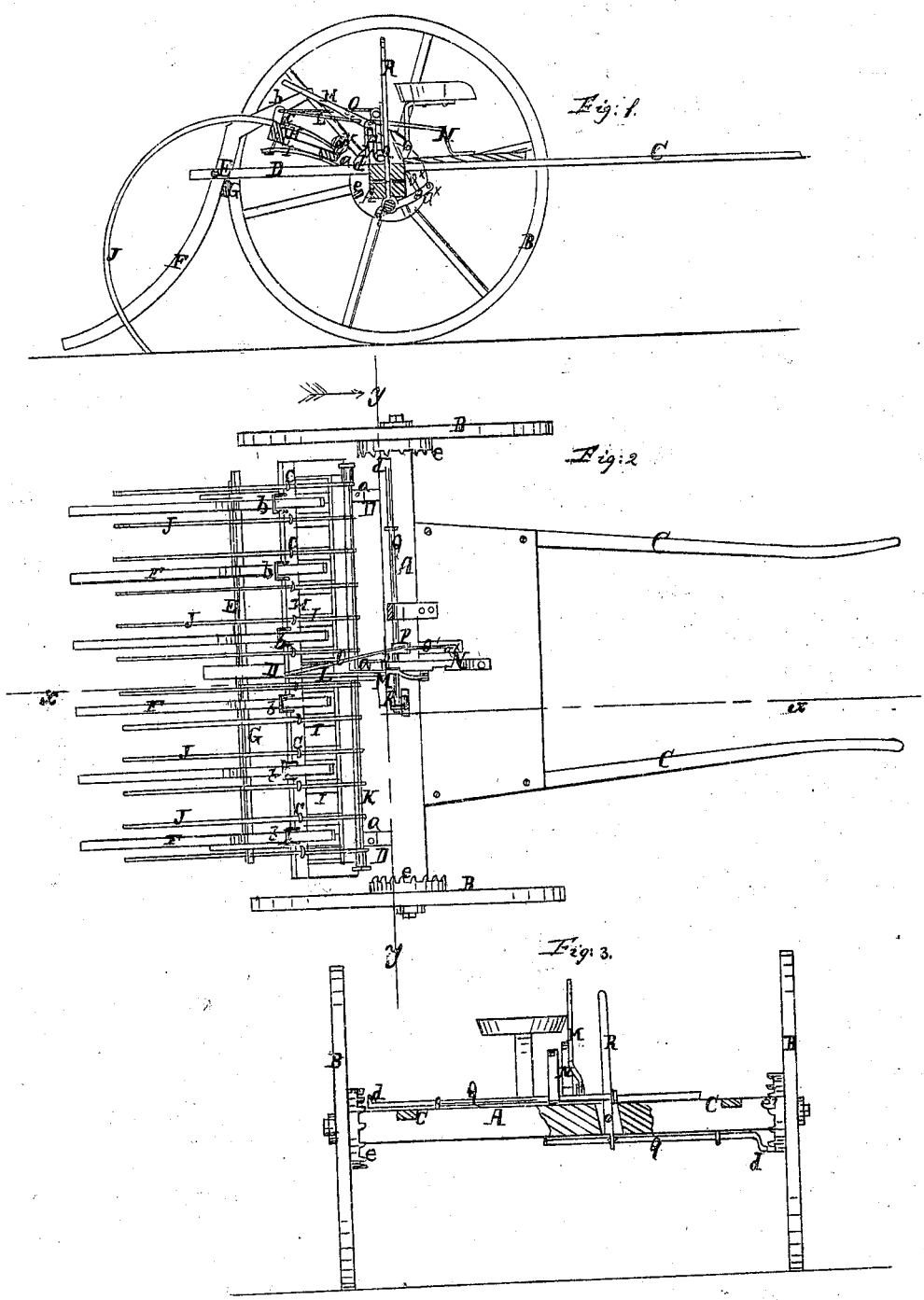

THOMAS STEWART, OF PITTSBURG, PENNSYLVANIA.

IMPROVEMENT IN HORSE-RAKES.

Specification forming part of Letters Patent No. 52,458, dated February 6, 1866.

*To all whom it may concern:*

Be it known that I, THOMAS STEWART, of Pittsburg, in the county of Allegheny and State of Pennsylvania, have invented a new and Improved Horse Hay-Rake; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, Fig. 2; Fig. 2, a plan or top view of the same; Fig. 3, a transverse vertical section of the same, taken in the line $y\,y$, Fig. 2.

Similar letters of reference indicate like parts.

This invention relates to a new and improved mode of raising the rake so that it may discharge its load. The rake is of that class which are constructed of wire teeth, and it is arranged in such a manner as to be raised by the wheels, as hereinafter set forth.

The invention further relates to a novel arrangement of the rake and clearers or dischargers, as hereinafter set forth, whereby the proper discharge of the load from the rake is insured.

A represents an axle having a wheel, B, at each end of it, and C C are thills attached to the axle and having a platform or foot-board secured upon their rear parts adjoining the axle.

The axle A has arms D projecting from its rear side, one near each end and one at the center, said arms serving as bearings for a shaft or rod, E, on which a series of fingers, F, are placed, of curved form, and extending downward nearly to the ground, as shown clearly in Fig. 1. The fingers F are secured to a bar, G, which holds them at a suitable and equal distance apart.

H is an oblong rectangular frame, one end of which is attached to the arms D by hinges $a$, the other and outer end having loops $b$ attached to it, through which the upper ends of the fingers F pass loosely.

To the under side of the frame H there are attached a series of springs, I, having rods $c$ connected to their outer ends, said rods passing through the outer part of the frame H, and having loops or eyes at their upper ends for the rake-teeth J to pass through. These rake-teeth are of curved form, like those of ordinary wire-toothed rakes, and they are fitted at their upper ends on a rod or shaft, K, on the upper part of the inner end of the frame H.

By this arrangement it will be seen that each tooth has an independent or separate movement, and the springs I have a tendency to keep the teeth down to their work, at the same time allowing them to yield or give individually to conform to the inequalities of surface over which they may pass; and the teeth may all be raised simultaneously by raising the frame H. This is done when the machine is being moved from place to place by means of a cord or chain, L, attached to the outer end of the frame H and to a lever, M, pivoted to the rear part of the platform or foot-board.

By shoving the upper end of the lever M forward the rear part of frame H will be raised, and consequently the teeth J, the latter being held in an elevated position, free from the surface of the ground, by fitting lever M in a notch in a bar, N, attached to the platform or foot-board and to the central arm, D.

The gravity of the teeth J and frame H is sufficient to keep the teeth down to their work.

O is a rod, one end of which is connected to the outer end of frame H, and the opposite end to an arm, P, which is attached to a sliding rod, Q, on the upper surface of the axle A. The outer end of this rod Q is bent to form a lip, $d$, at right angles with the rod, or nearly so, said lip, when the rod Q is shoved toward the hub of one of the wheels B, coming in contact with teeth $e$ on said hub, which causes the rod Q to turn and the arm P to draw or actuate the rod O, which elevates the frame H.

To the under side of the axle A there is attached a sliding rod, Q', the outer end of which is provided with a lip, $d'$, to engage with the teeth $e'$ on the hub of the other wheel B. This rod Q' is connected with the arm P of rod Q by means of a rod, O', extending from a crank, $a^*$, at the inner end of Q', and the inner ends of both rods Q Q' are connected to a lever, R, pivoted in the axle A. By actuating this lever R both rods Q Q' may be moved simultaneously and their lips $d\,d'$ thrown into gear with the teeth $e\,e'$ of the wheels B and the rake-teeth J elevated so as to discharge their load, the teeth falling by their own gravity as soon as the rods Q Q' are drawn inward and the lips d d' freed from the teeth e e' of the hubs of the wheels.

Thus by this simple arrangement much labor is saved, as the rake is elevated from the wheels of the machine under the draft movement of the latter.

The fingers F serve as clearers to insure the free discharge of the hay as the teeth J are elevated.

Having thus described my invention, I claim as new and desire to secure by Letters Patent—

1. The sliding rods Q Q', one or both, provided with the lips d d' at their outer ends, and connected at their inner ends to a lever, R, and also connected to the hinged frame H, to which the rake-teeth J are attached, and all arranged to operate substantially as and for the purpose set forth.

2. The combination of the rake-teeth J with the hinged frame H and fingers F, all arranged to operate substantially as and for the purpose herein specified.

The above specification of my invention signed by me this 12th day of October, 1865.

THOMAS STEWART.

Witnesses:
JOHN ADAMS,
THOS. OWSTON.